(12) United States Patent
Reller et al.

(10) Patent No.: US 12,050,092 B2
(45) Date of Patent: Jul. 30, 2024

(54) MECHANISM FOR ATTACHMENT AND DETACHMENT OF AN AIRFOIL TO AN AIRFRAME

(71) Applicant: Raytheon Company, Tewksbury, MA (US)

(72) Inventors: Dan L. Reller, Vail, AZ (US); Paul T. Hudak, Vail, AZ (US); Andrew P. Frits, Jr., Tucson, AZ (US); Scott Andrew Holbrook, Marana, AZ (US)

(73) Assignee: Raytheon Company, Tewksbury, MA (US)

( * ) Notice: Subject to any disclaimer, the term of this patent is extended or adjusted under 35 U.S.C. 154(b) by 118 days.

(21) Appl. No.: 17/950,539

(22) Filed: Sep. 22, 2022

(65) Prior Publication Data

US 2024/0102778 A1  Mar. 28, 2024

(51) Int. Cl.
*F42B 10/06* (2006.01)
*B64C 1/26* (2006.01)

(52) U.S. Cl.
CPC .............. *F42B 10/06* (2013.01); *B64C 1/26* (2013.01)

(58) Field of Classification Search
CPC . F42B 10/06; F42B 10/04; B64C 1/26; A63H 27/005; A63H 27/001; B63B 32/66
See application file for complete search history.

(56) References Cited

U.S. PATENT DOCUMENTS

| | | | |
|---|---|---|---|
| 3,004,645 A | 10/1961 | Moul, Jr. | |
| 3,048,109 A | 8/1962 | Feemster | |
| 3,117,520 A | 1/1964 | Kerr et al. | |
| 3,219,158 A | 11/1965 | Carter et al. | |
| 5,014,931 A | 5/1991 | Mikhail | |
| 8,367,992 B1 | 2/2013 | Patel et al. | |
| 2007/0075183 A1 | 4/2007 | Fisch et al. | |
| 2010/0219285 A1 | 9/2010 | Facciano et al. | |

OTHER PUBLICATIONS

"International Application Serial No. PCT US2023 070622, International Search Report mailed Oct. 14, 2023", 5 pgs.
"International Application Serial No. PCT US2023 070622, Written Opinion mailed Oct. 18, 2023", 5 pgs.

*Primary Examiner* — Timothy D Collins
*Assistant Examiner* — Justin Michael Heston
(74) *Attorney, Agent, or Firm* — Schwegman Lundberg & Woessner, P.A.

(57) ABSTRACT

A mechanism for attachment and detachment of a fixed or controllable airfoil to an airframe includes a base adapted for attachment to a root of the airfoil and a slot beam adapted for attachment along the airframe (e.g., parallel to the longitudinal X-axis of the airframe). The base includes a plurality of pins spaced along and held between parallel rails. The slot beam includes a plurality of slots arranged along the beam. Each slot has a lead-in portion to receive one of the plurality of pins and a longitudinally-oriented tapered portion (e.g., parallel to the longitudinal X-axis with a taper between 1 and 5 degrees) to engage the pin so that the base is seated in the slot beam to position the airfoil against the airframe in an XY plane. A pre-load mechanism is configured to apply a force along the X-axis to press the plurality of pins into the respective tapered portions to fix the base relative to the slot beam in six degrees of freedom (6 DOF).

18 Claims, 13 Drawing Sheets

PIN RETRACTED

FIG. 11A

PIN ENGAGED

FIG. 11B

MECHANISM FOR ATTACHMENT AND DETACHMENT OF AN AIRFOIL TO AN AIRFRAME

BACKGROUND

Field

This disclosure relates to airfoils such as wings, fins, canards or the like that may be mounted on a static joint or a moveable actuator on an airframe and more particularly to mechanisms for attaching or detaching such airfoils.

Description of the Related Art

Air vehicles such as missiles (sub-sonic, super-sonic and hyper-sonic), rockets, guided artillery shells, manned aircraft and unmanned aerial vehicles (UAVs) include various airfoils such as wings, canards and fins mounted on an airframe to provide lift, stability or control. The airfoils may be fixed to a static joint of the airframe or mounted on a movable actuator to rotate to provide a control surface. Most airfoils are permanently mounted to the airframe at the time of assembly. Some airfoils may be stowed against or within the airframe and then deployed at launch or in flight.

Some air vehicles have "volumetric" constraints due to storage or transport limitations. For example, the requirements to store or transport missiles with the various airfoils installed is much greater than if the airframe could be stored or transported without the airfoils. Furthermore, newer and larger missiles may be simply too big too move around ships with the airfoils installed.

Figure 1:
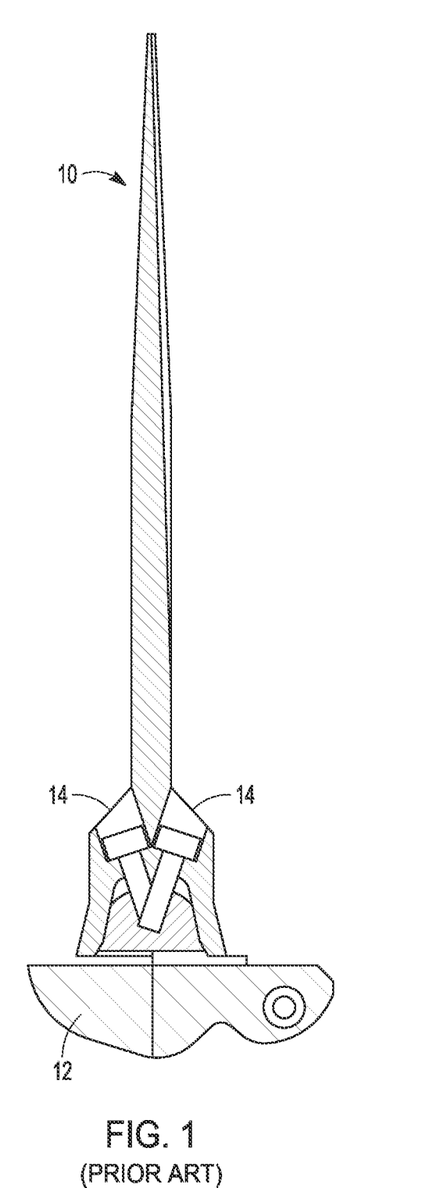
FIG. 1, as described above, illustrates a fixed airfoil that is removably attached to an airframe via exterior fastening bolts.
Figure 2:
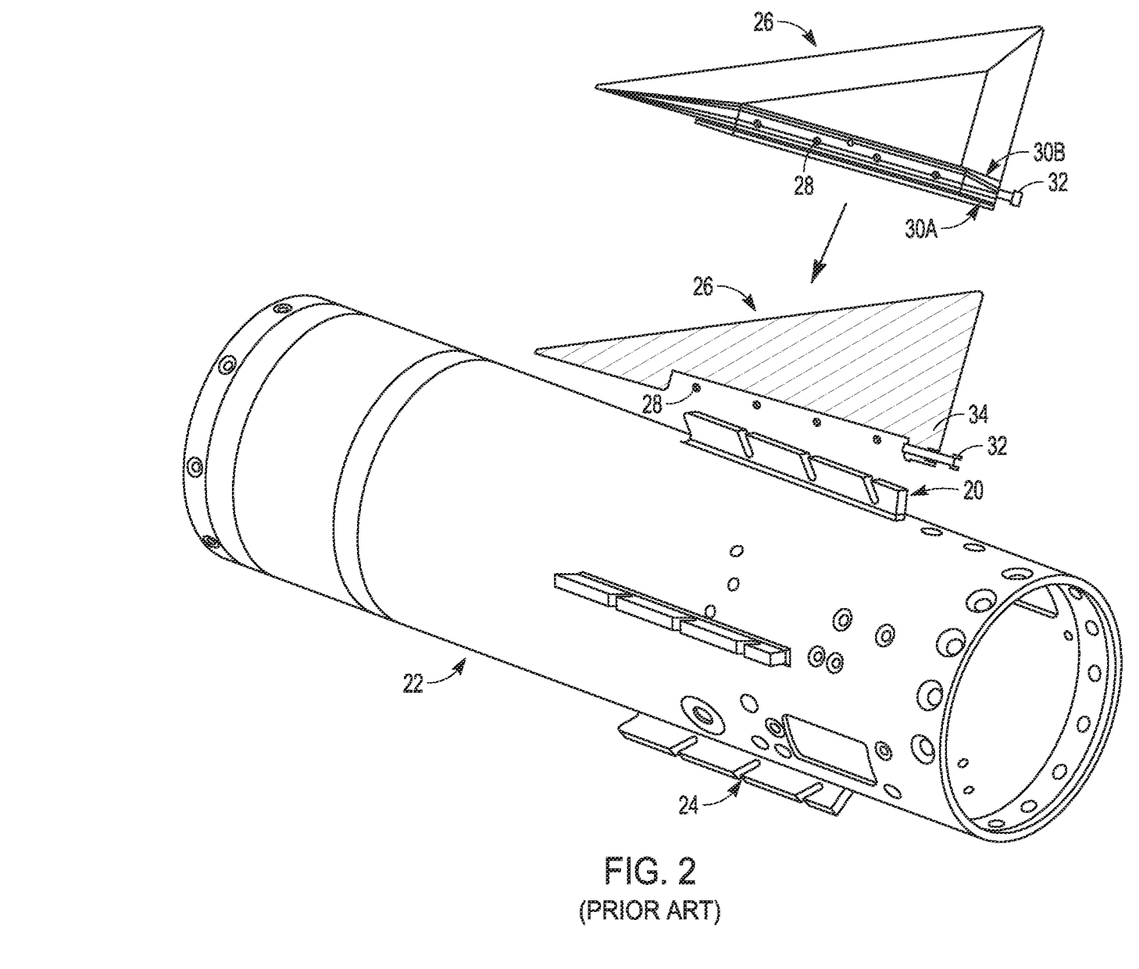
FIG. 2, as described above, illustrates a fixed airfoil that is removably attached to an airframe using a jacking bolt to engage pins on the airfoil with notches on a slot beam.
Figure 3:
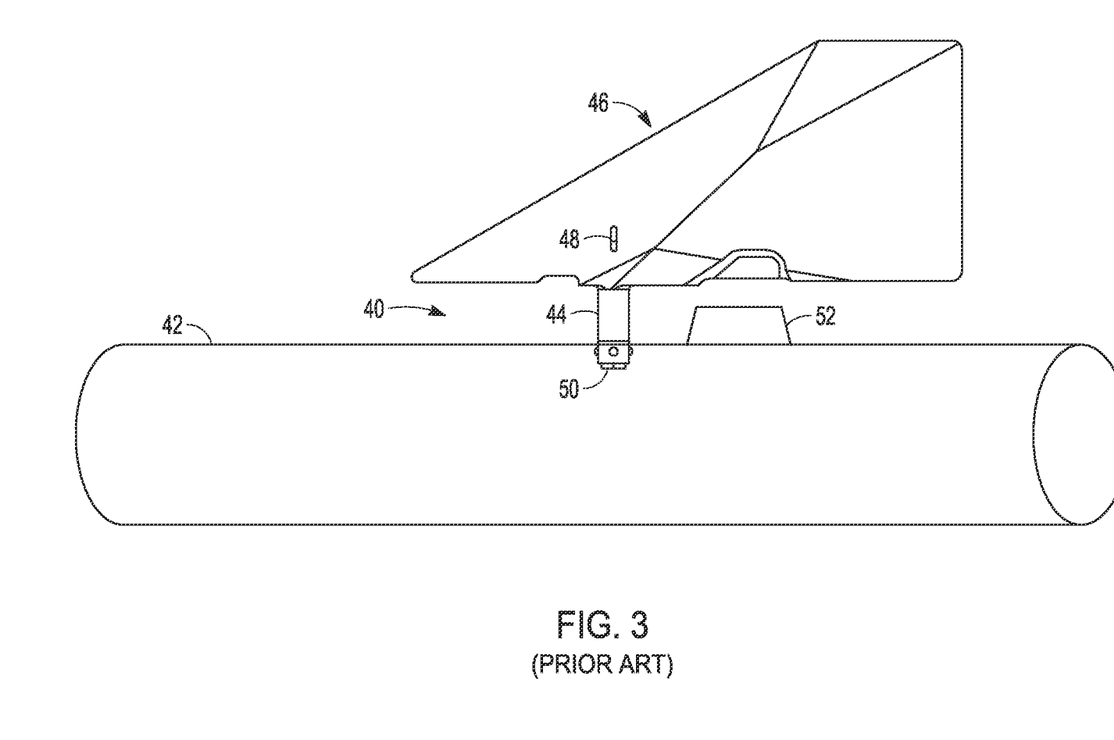
FIG. 3, as described above, illustrates a fixed airfoil that is removably attached to an airframe via a lockable plunger mechanism.
Figure 4A:
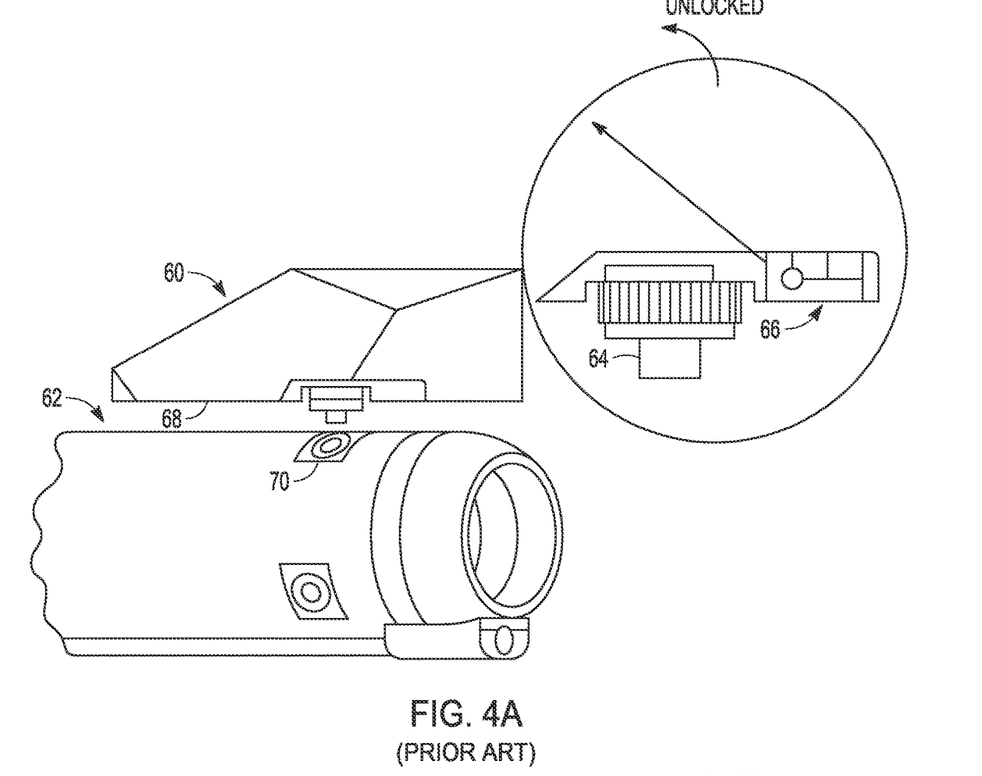
FIGS. 4A-4B as described above, illustrates a controllable airfoil that is removably attached to a control actuation system (CAS) in an airframe using a threaded coupler mechanism in its unlocked and locked positions.
Figure 4B:
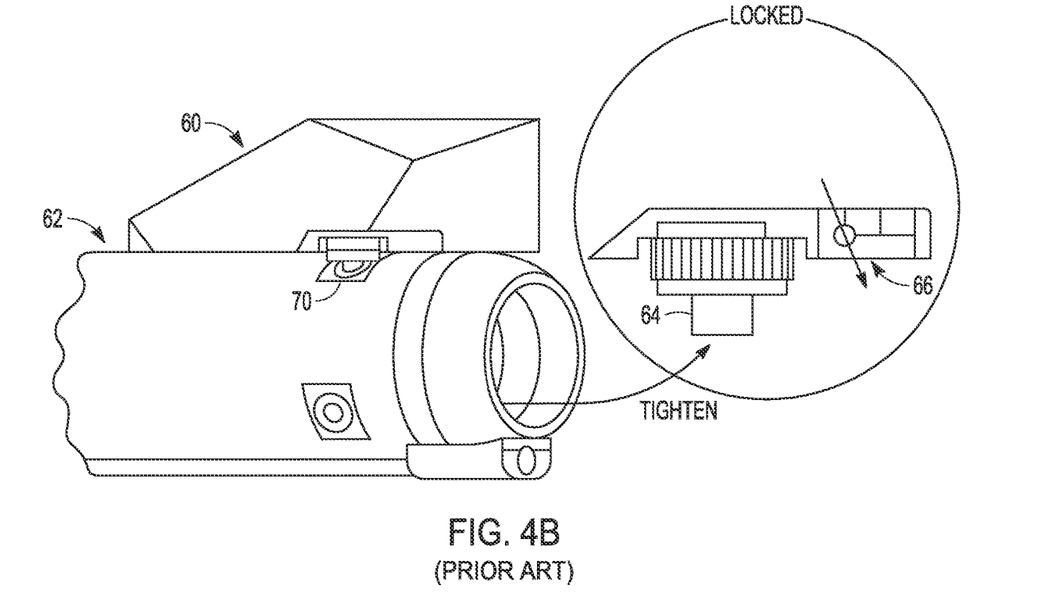
Figure 5:
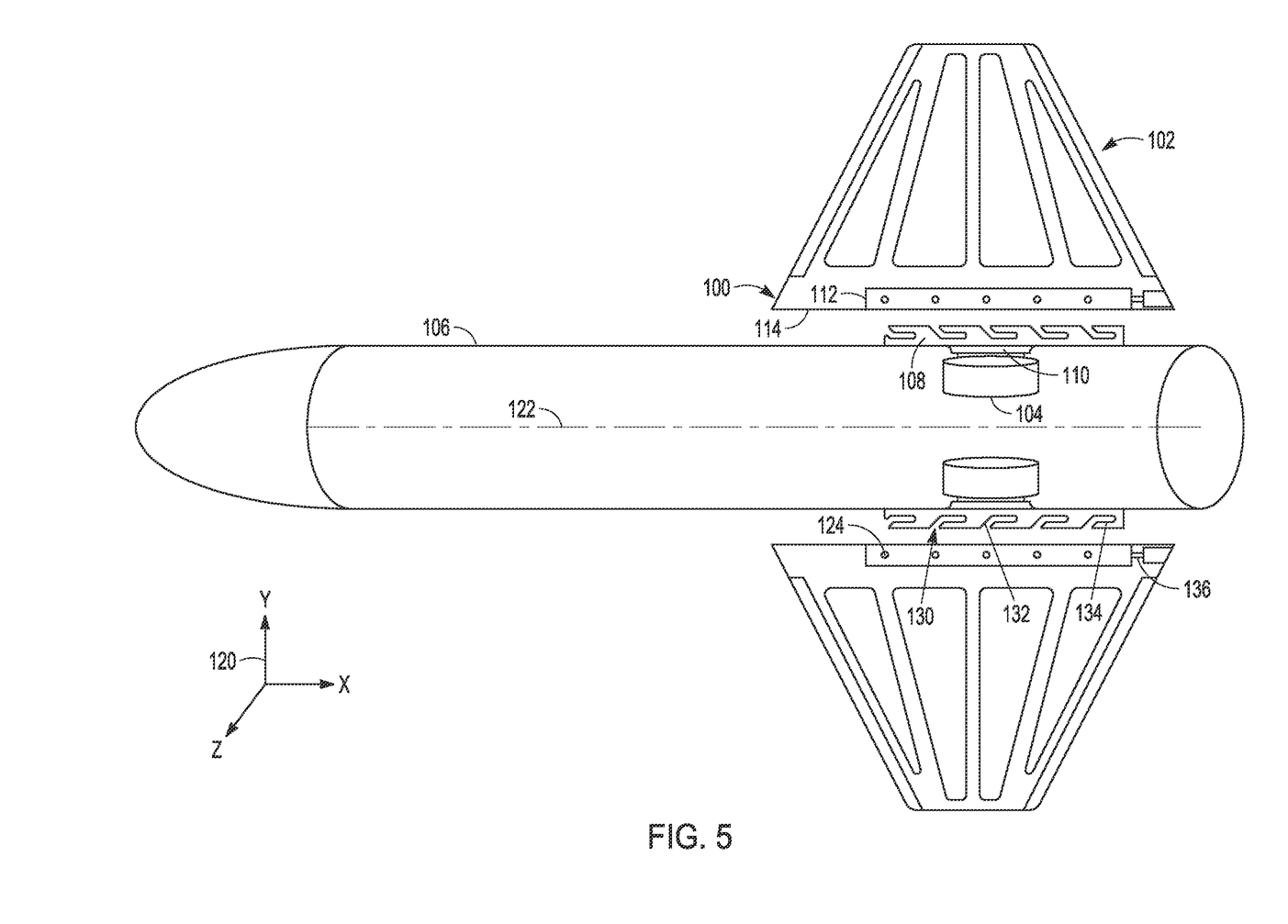
FIG. 5 illustrate an embodiment of a mechanism for attachment/detachment of a fixed or controllable airfoil to an airframe in which the mechanism includes a plurality of pins held between parallel rails on the root of the air foil and a slot beam on the airframe in which each slot includes a lead-in portion to receive a pin and a tapered longitudinal portion to secure the pin and airfoil in 6 DOF.
Figure 6A:
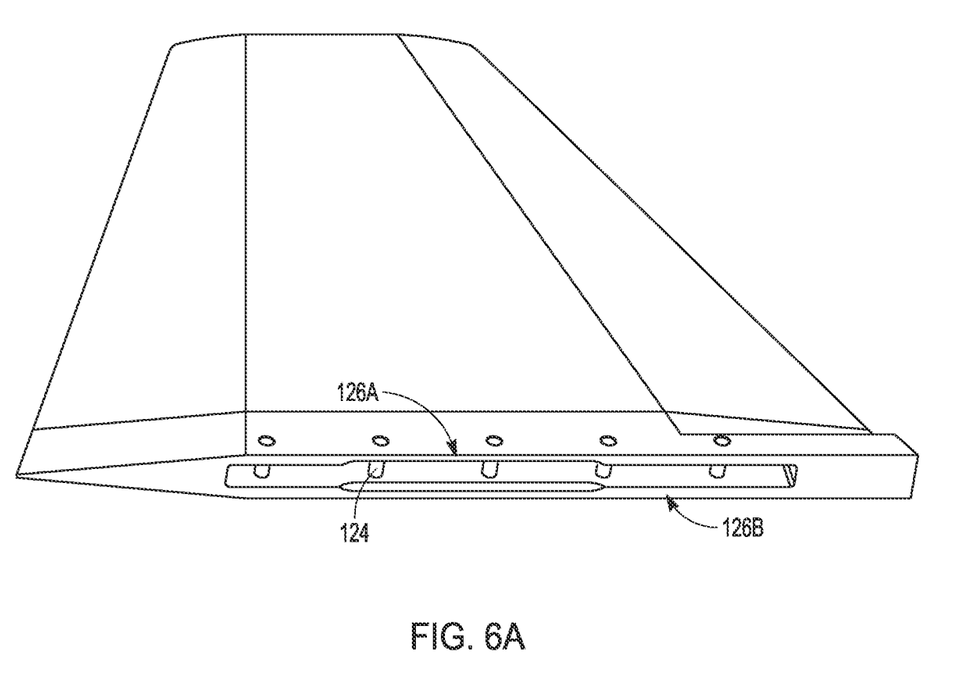
FIGS. 6A-6C illustrate various views of the mechanism.
Figure 6B:
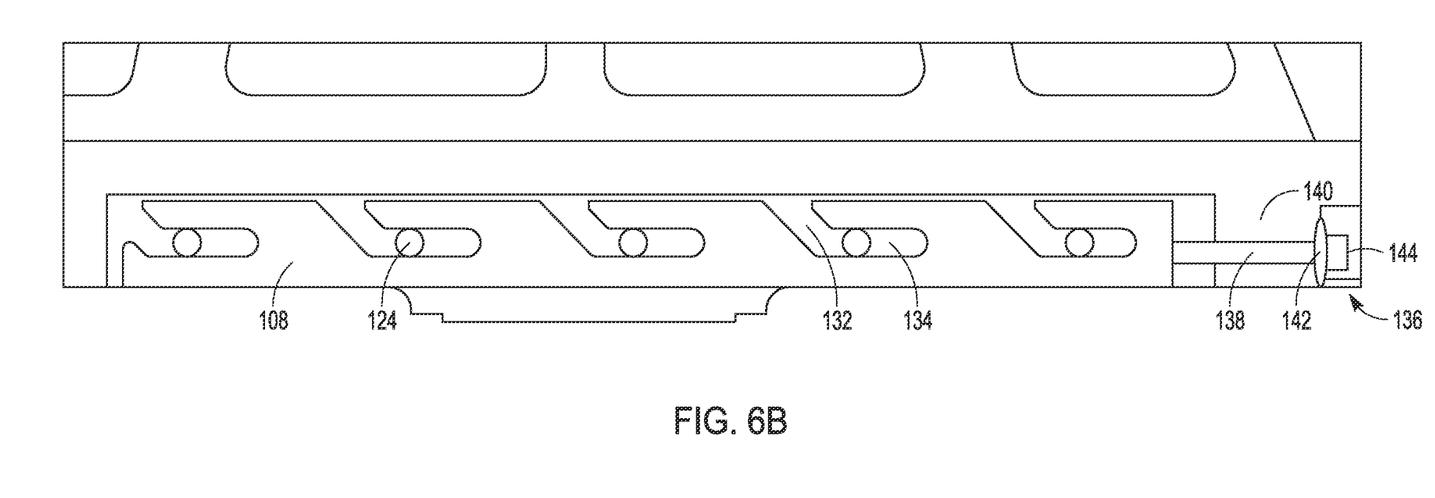
Figure 6C:
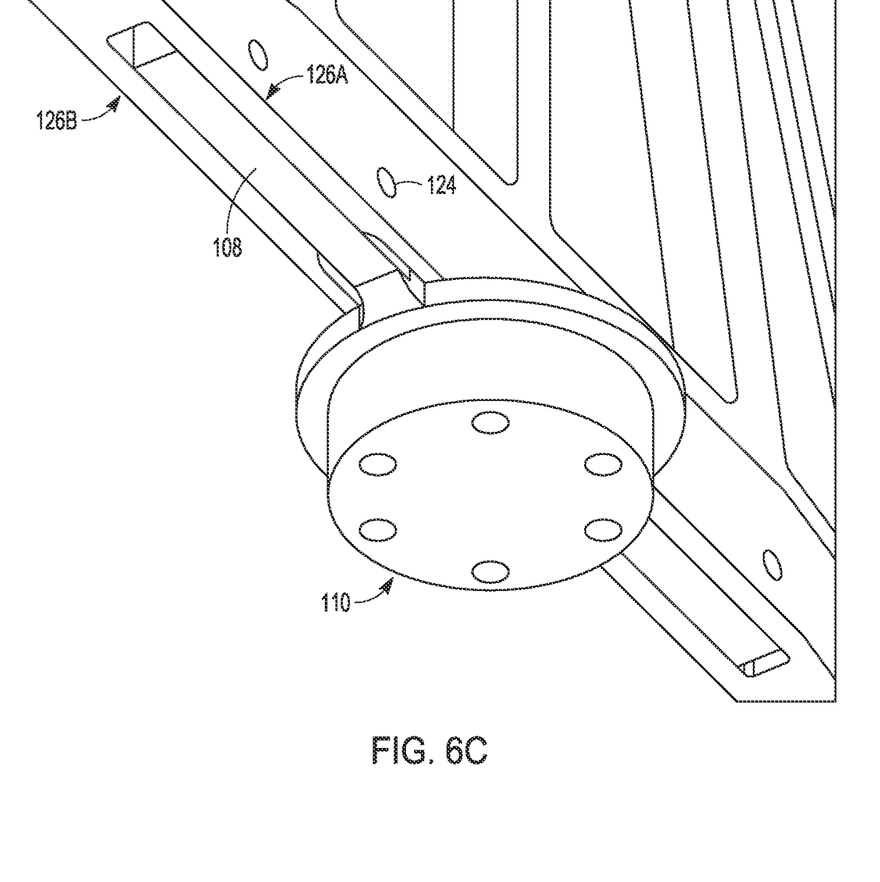
Figure 7A:
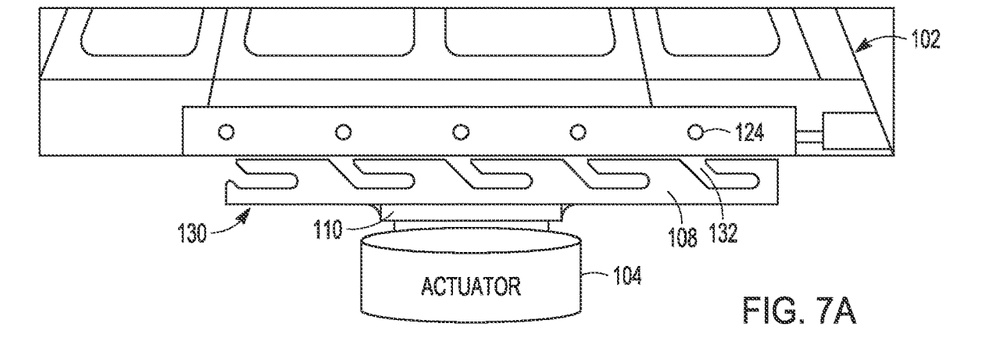
FIGS. 7A-7D illustrate a sequence of steps for attaching a controllable airfoil to an CAS in an airframe using the mechanism.
Figure 7B:
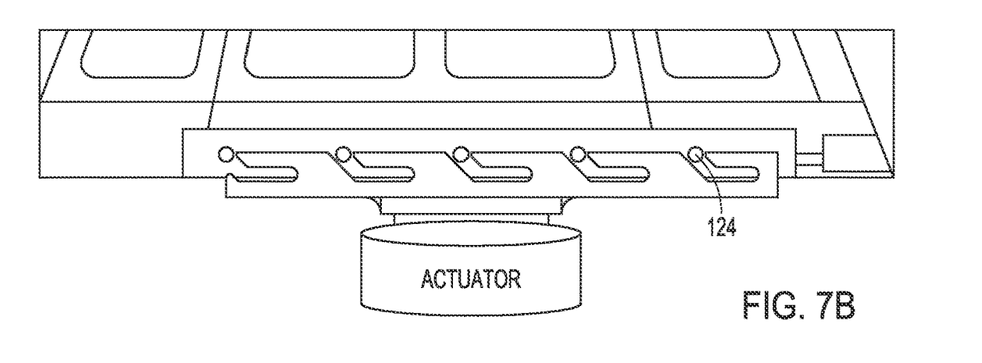
Figure 7C:
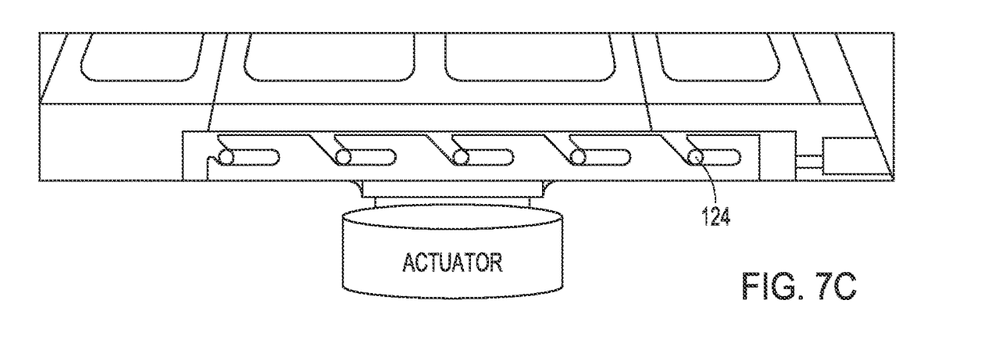
Figure 7D:
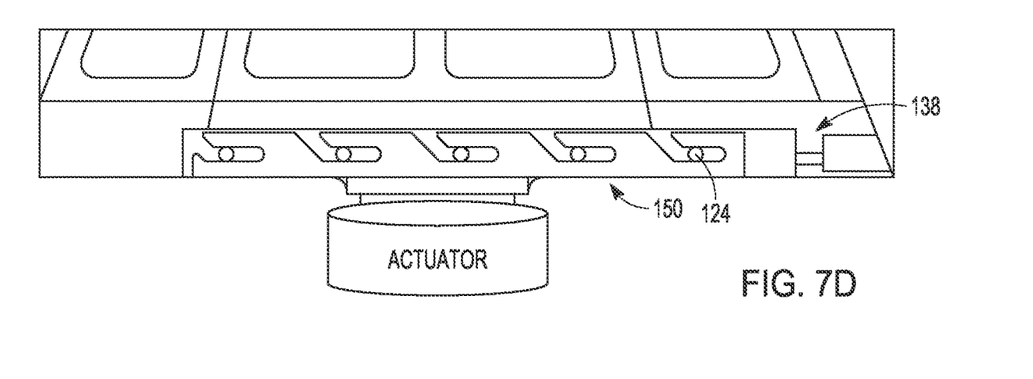

Mechanisms exist to attach/detach airfoils to an airframe. In general, such mechanisms should facilitate a quick and simple installation of the airfoil, provide a rigid and reliable joint in multiple degrees of freedom (DOF), be scalable to larger airfoils and loads, not require field installation of thermal or pressure seals, not present any Free Object Debris (FOD) during assembly and not present any intrusion into a flow field over the airframe and airfoil. The specific requirements for such a mechanism depend on the nature of the airframe, the size and expected loads on the airfoils and speed of the airframe. FIGS. 1-3 depict mechanisms for attaching fixed airfoils to an airframe. FIG. 4 depicts a mechanism for attaching an airfoil to an actuator to provide a control surface.

Referring now to FIG. 1, an airfoil 10 can be affixed to an airframe 12 using fasteners 14 driven through the airfoil into the airframe. Fasteners provide a risk of FOD and present an intrusion into the flow field.

Referring now to FIG. 2, a beam 20 is mounted longitudinally along the X-axis of an airframe 22. Beam 20 includes a plurality of forward-leaning slots 24. An airfoil 26 includes a plurality of pins 28 spaced along and held between parallel rails 30A and 30B. The airfoil 26 is positioned to seat pins 28 into respective slots 24. A jacking bolt 32 is threaded through an aft section 34 of the airfoil. Once seated, jacking bolt 32 is manually threaded to produce a force along the X-axis to press the pins 28 into the respective slots 24 to hold the fixed airfoil 26. The jacking bolt relies on torque or anaerobic adhesive to hold it in place. This mechanism does not transmit high lateral or normal panel load forces efficiently and thus is better suited for stability and loads about the X-axis, which is adequate for a fixed airfoil.

Referring now to FIG. 3, a plunger mechanism 40 is mounted within an airframe 42. In its unlocked position, a post 44 extenders perpendicular to the airframe. An airfoil 46 is mounted on post 44. A detent 48 is disengaged and the post 44 is pushed down inside the airframe so that the airfoil is flush with the outer surface of the airframe. Detent 48 is engaged to engage a ball lock 50 to hold the post 44 inside the airframe. Tabs 52 are mounted on the airframe on either side of airfoil 46 to improve stability of the fixed airfoil.

Referring now to FIGS. 4A-4B, a mechanism for attaching/detaching a control surface 60 to an actuator within the volume of an airframe 62. The mechanism includes a female portion 64 of a threaded coupler and a cam lock 66 formed along a root 68 of control surface 60 and a male portion 70 of the threaded coupler attached to the actuator. The "root" is the part of the airfoil that is closest to the air frame and is the junction of the airfoil to the airframe. The mechanism does provide rigidity in 6 DOF (along each of the X, Y and Z axes and the moments about each) required of a control surface. However, the mechanism is complex and does not scale well to larger control surfaces. Furthermore, the coupler intrudes into the flow field. Also, any thermal or pressure seals would need to be field installed.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides a mechanism for attachment/detachment of a fixed or controllable airfoil to an airframe that facilitates a quick and simple installation of the airfoil, provides a rigid 6 DOF joint, is scalable to larger airfoils and loads, does not require field installation of thermal or pressure seals, does not present any FOD during assembly and does not present any intrusion into a flow field over the airframe and airfoil. The mechanism may be used to attach various airfoils such as wings, canards and fins to an airframe to provide lift, stability or control for air vehicles including but not limited to missiles (sub-sonic, super-sonic and hyper-sonic), rockets, guided artillery shells, manned aircraft and UAVs.

In an embodiment, a mechanism for attachment and detachment of an airfoil to an airframe includes a base adapted for attachment to a root of the airfoil and a slot beam adapted for attachment along the airframe (e.g., parallel to the longitudinal X-axis of the airframe). The base includes a plurality of pins spaced along and held between parallel rails. The slot beam includes a plurality of slots arranged along the beam. Each slot has a lead-in portion to receive one of the plurality of pins and a longitudinally-oriented tapered portion (e.g., parallel to the longitudinal X-axis with a taper between 1 and 5 degrees) to engage the pin so that the base is seated in the slot beam to position the airfoil against the airframe in an XY plane. Typically, the lead-in portion will lean forward towards the front of the airframe and the tapered portion will extend aft. A pre-load mechanism is configured to apply a force along the X-axis to press the plurality of pins into the respective tapered portions to fix the base relative to the slot beam in six degrees of freedom (6 DOF).

In an embodiment, the slot-beam is mounted on and suitably integrally formed with a fixed joint of the air frame to provide a fixed airfoil. The rigid 6 DOF joint removes all compliance and improves the stability of the fixed airfoil.

In an embodiment, the slot beam is mounted on and suitably integrally formed with a hub recessed in the airframe and connected to an actuator configured to rotate the hub and airfoil about the Y-axis as a control surface. The rigid 6 DOF joint provides the required capability to transfer lateral bending loads between the actuator and the airfoil.

In an embodiment, the slot beam provides a universal connector for different types and sizes of airfoils. The airfoil may have a pin out that provides an equal number of pins to engage each of the slots in the slot beam or a reduces number of pins to engage a subset of the slots in the slot beam.

In different embodiments, the pre-load mechanism may be manually-actuated or not. A manually threaded fastener may be used to pre-load the pins. The fastener may be provided with a Belleville washer to lock the fastener in place and maintain the pre-load throughout flight. Alternately, the pre-load mechanism may comprise a positive retention spring or spring-loaded ball lock pin that provide pre-loading without manual intervention.

These and other features and advantages of the disclosure will be apparent to those skilled in the art from the following detailed description of preferred embodiments, taken together with the accompanying drawings, in which.

DETAILED DESCRIPTION

The present disclosure provides a mechanism for attachment/detachment of a fixed or controllable airfoil to an airframe that facilitates a quick and simple installation of the airfoil, provides a rigid 6 DOF joint, is scalable to larger airfoils and loads, does not require field installation of thermal or pressure seals, does not present any FOD during assembly and does not present any intrusion into a flow field over the airframe and airfoil. The mechanism may be used to attach various airfoils such as wings, canards and fins to an airframe to provide lift, stability or control for air vehicles including but not limited to missiles (sub-sonic, super-sonic and hyper-sonic), rockets, guided artillery shells, manned aircraft and UAVs. A rigid 6 DOF joint improves the performance of fixed airfoils and is required for control surfaces in order to accurately respond to control actuation commands.

Referring now to FIGS. 5 and 6A-6C, an embodiment of a mechanism 100 for attaching/detaching an airfoil 102 to an actuator 104 in an airframe 106 to provide a 6 DOF rigid joint includes a slot beam 108 mounted on or integrally formed with a hub 110 and a base 112 attached to or integrally formed along a root 114 of airfoil 102. In a preferred configuration, the hub, which is a mechanical interface between slot beam 108 and actuator 104, and the slot beam 108 are installed during assembly of airframe 106 prior to storage or transport. Any thermal or pressure seals or anything other than the airfoil 102 are also configured during assembly of the airframe.

Without loss of generality, the configuration of the mechanism for attaching airfoil 102 to airframe 106 will be described in the context of an XYZ coordinate system 120 in which the longitudinal axis 122 of airframe 106 lies along the X-axis. Each slot beam 108 is attached longitudinally along the airframe (e.g., parallel to the longitudinal X-axis). Each airfoil 102, in its fixed or neutral control position, lies in the XY plane.

Base 112 includes a plurality of pins 124 spaced along and held between parallel rails 126A and 126B. Slot beam 108 includes a plurality of slots 130 arranged along the beam. Each slot has a lead-in portion 132 to receive one of the plurality of pins 124 and a longitudinally-oriented tapered portion 134 (e.g., parallel to the longitudinal X-axis with a taper between 1 and 5 degrees) to engage the pin 124 so that the base 112 is seated in the slot beam 108 to position the airfoil 102 against the airframe 106 in an XY plane. Typically, the lead-in portion 132 will lean forward towards the front of the airframe and the tapered portion will extend aft. The diameter of lead-in portion 132 is greater than the diameter of pin 124 such that the pin moves down and back and then longitudinally to enter tapered portion 134. The diameter at the transition to tapered portion 134 is also greater than the diameter of pin 124. The diameter is reduced as the slot tapers until it engages and holds pin 124. A pre-load mechanism 136 is configured to apply a force along the X-axis to press the plurality of pins 124 into the respective tapered portions 134 to fix the base relative to the slot beam and form a rigid joint in six degrees of freedom (6 DOF).

Figure 11A:
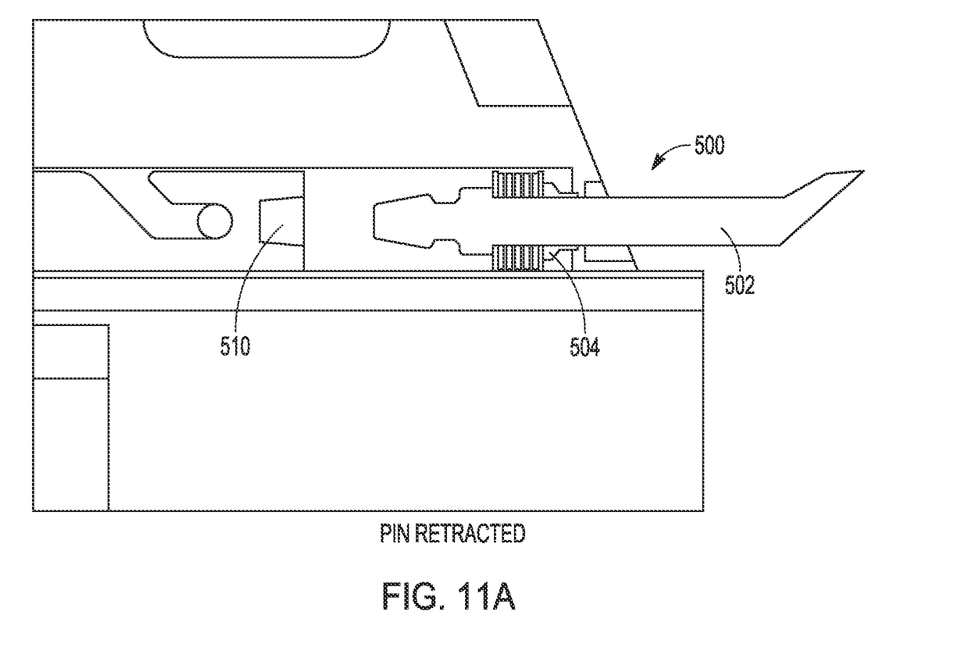
FIGS. 11A and 11B illustrate an alternate embodiment of a pre-load mechanism including a spring-loaded retracting pin that secures the airfoil without manual intervention.
Figure 11B:
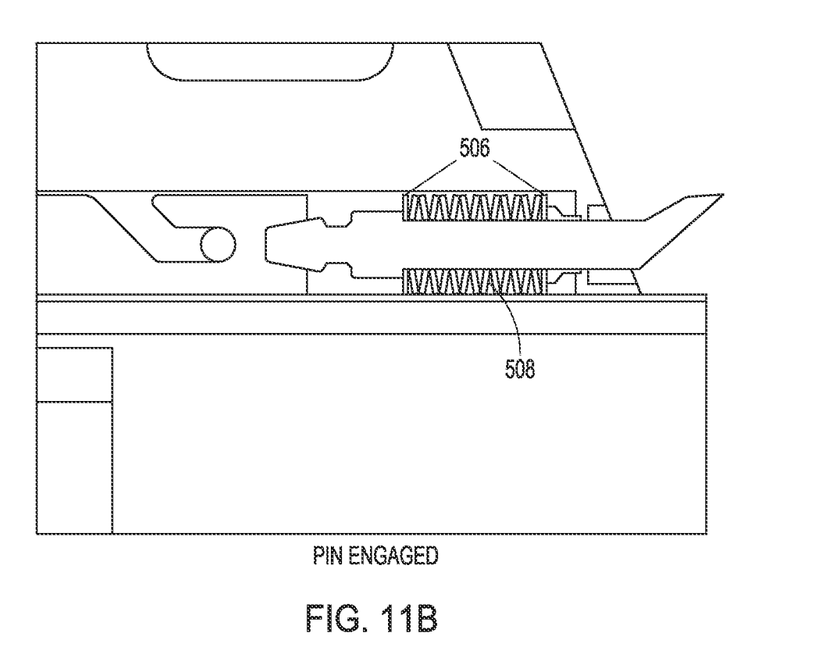

As shown the pre-load mechanism 136 is a threaded fastener 138 that extends through an aft section 140 of the base and is manually actuated to preload the pins. A Belleville washer 142 positioned between a head 144 of the fastener and the aft section 140 to lock the fastener 138 in place and hold the pre-load throughout dynamic events as would be experienced during flight. Alternately, the pre-load mechanism may comprise a positive retention spring or spring-loaded ball lock pin that provide pre-loading without manual intervention. Once such concept as shown in FIGS. 11A and 11B is a spring-loaded retracting pin 500. The mechanism would eliminate the need for any additional tooling and reduces complexity for the installation process. A pin 502 is configured to slide through a bushing 504 on the airfoil side. A series of washers 506 and a spring 508 can spring rate matched to the desired preload. A pin socket or receptacle 510 on the beam side would capture the end of the pin 502.

Referring now to FIGS. 7A-7D, airfoil 102 is rigidly attached to actuator 104 in an airframe to provide a 6 DOF rigid joint by aligning pins 124 of airfoil 102 to respective lead-in portions 132 of slots 130 in slot beam 108 (previous attached to or integrally formed with hub 110) and then engaging pins 124 into the lead-in portions 132. Pins 124 transition into the tapered portions 134 of the slots to seat the base in the slot beam and position the airfoil against the airframe in an XY plane. Threaded fastener 138 is manually actuated to apply a force along the X-axis to press the plurality of pins 124 into the respective tapered portions 134 to fix the base relative to the slot beam forming a rigid joint 150 in six degrees of freedom (6 DOF).

As described, the mechanism a quick and simple installation of the airfoil, simply align the airfoil pins to the lead-in portions in the slot beam, seat the airfoil into the slot beam and actuate the pre-load mechanism. The mechanism presents no risk of FOD during assembly. Any thermal or pressure seals can be installed when the slot beam is fixed to the airframe or actuator during assembly of the overall airframe and thus not in the field. The design readily scales to larger airfoils and more severe load requirements. The mechanisms is entirely hidden, presents no intrusion into the flow field, which is critical at super and hypersonic speeds. The mechanism may be used to attach various airfoils such as wings, canards and fins to an airframe to provide lift, stability or control for air vehicles including but not limited to missiles (sub-sonic, super-sonic and hyper-sonic), rockets, guided artillery shells, manned aircraft and UAVs. The mechanism provides a rigid 6 DOF joint improves the performance of fixed airfoils and is required for control surfaces in order to accurately respond to control actuation commands.

Figure 8A:
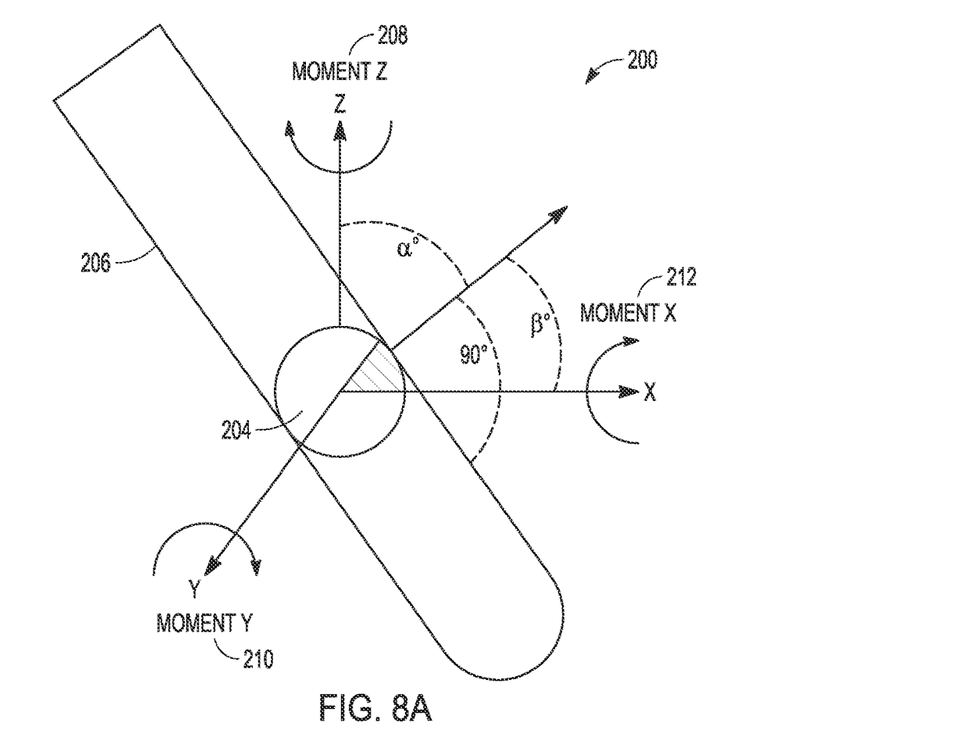
FIGS. 8A and 8B are solid body diagrams illustrating the difference in shear area resulting from the contact constraints within the slot geometry of the known mechanism of FIG. 2 and the disclosed mechanism of FIG. 5, respectively.
Figure 8B:
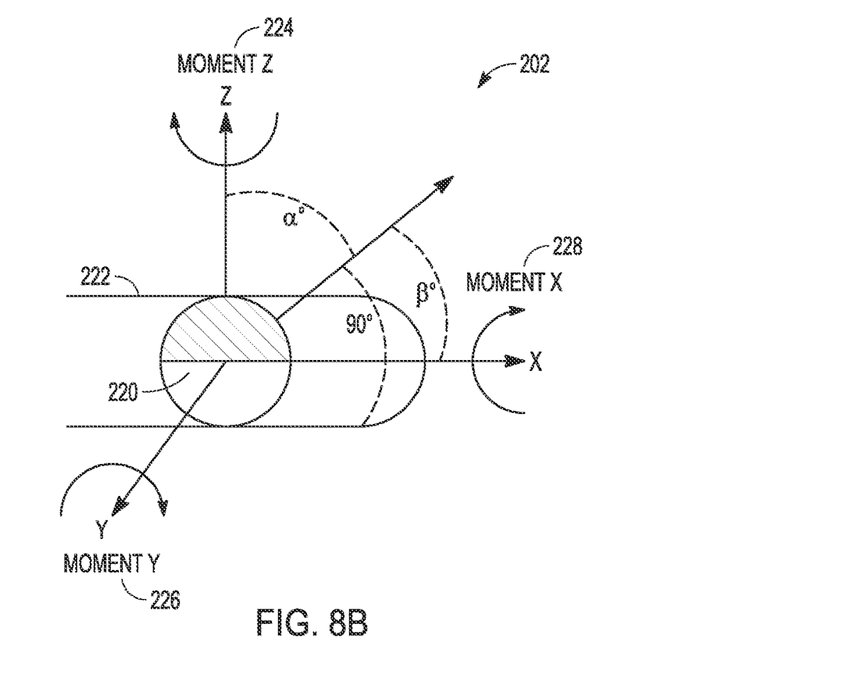

FIGS. 8A and 8B are solid body diagrams 200 and 202 illustrating the difference in shear area resulting from the contact constraints within the slot geometry of the mechanism for attachment/detachment of a fixed airfoil shown in FIG. 2 and the mechanism for attachment/detachment of fixed or controllable airfoils shown in FIGS. 5 and 6A-6C in accordance with the present disclosure. In the mechanism for a fixed airfoil a pin 204 is captured in a forward leaning slot 206. Slot 206 constrains Moment Z 208 but with a small shear area, a –Z force can drive a +X displacement. Multiple pins constrain Moment Y 210 but with a small shear area and lateral clearance Y-displacement. The pin shear around is small to constrain "Moment X" 212 and very little contact and friction to trap Z-displacement. By contrast, in the mechanism for a fixed or controllable airfoil in accordance with the present disclosure a pin 220 is captured in a longitudinally-oriented tapered portion 222 of a slot. The tapered portion of the slot constraints "Moment Z" 224 and +X displacement. Multiple pins constraint "Moment Y" 226 and lateral clearance Y-displacement. The pin shear around is much larger to constraint "Moment X" 228 and the taper traps Z-displacement. With the longitudinally-oriented tapered slot, not only is displacement managed but also rotation about each axis. The slot geometry, i.e., angle relative to the driving force and the features to lock down line contact, contribute to the overall ability to prevent all rigid body motion.

Figure 9:
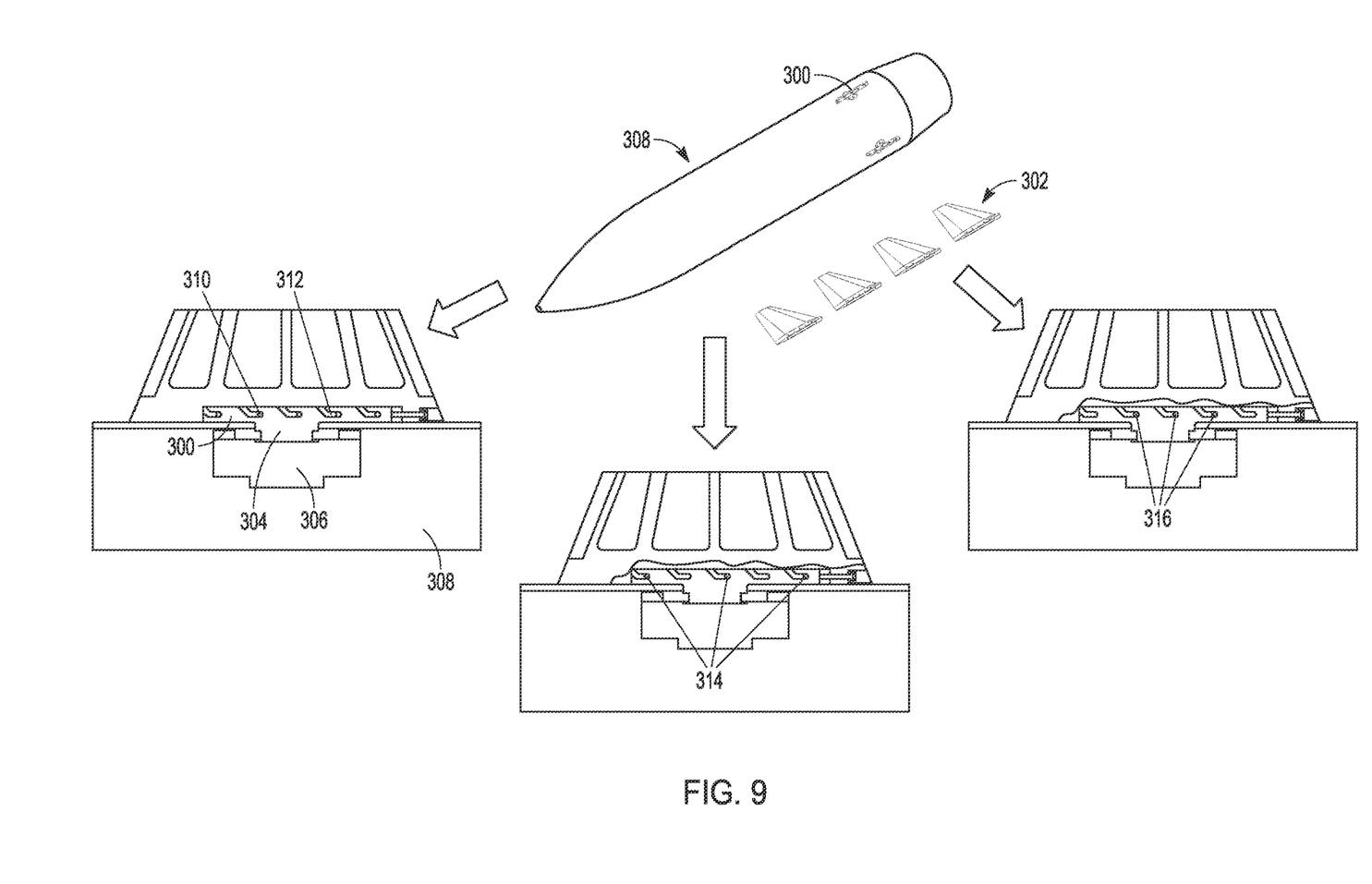
FIG. 9 is a drawing illustrating a universal mechanism for connection to airfoils having different pin configurations.

Referring now to FIG. 9, in an embodiment, a slot beam 300 provides a universal connector for different types and sizes of airfoils 302. Slot beam 300 is attached to or integrally formed with a hub 304 that is attached to a control actuation system (CAS) actuator 306 inside an airframe 308. The slot beam 300 and hub 304 are installed during assembly of the airframe 308. Airfoils 302 are provided (stored and transported) separately and assembled in the field. As shown in the lower left, airfoil 302 may have a pin out that provides an equal number of pins 310 to engage each of the slots 312 in the slot beam 300 or a reduces number of pins to engage a subset of the slots in the slot beam. As shown in the bottom center, pins 314 are arranged to engage every other slot 312 and as shown in the lower right, the pins 316 are arranged to engage a contiguous subset of slots 312 in the center of the slot beam. The particular pin out may depend on the surface area of the airfoil or the expected loads encountered by the airfoil.

Figure 10A:
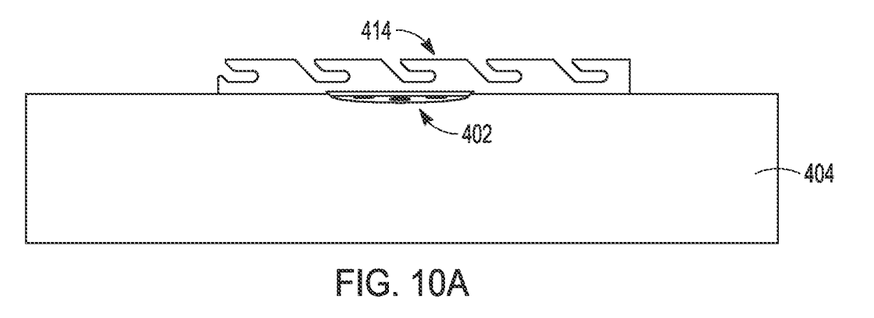
FIGS. 10A-10C illustrate a sequence of steps for attaching a fixed airfoil to a static joint in an airframe using the mechanism.
Figure 10B:
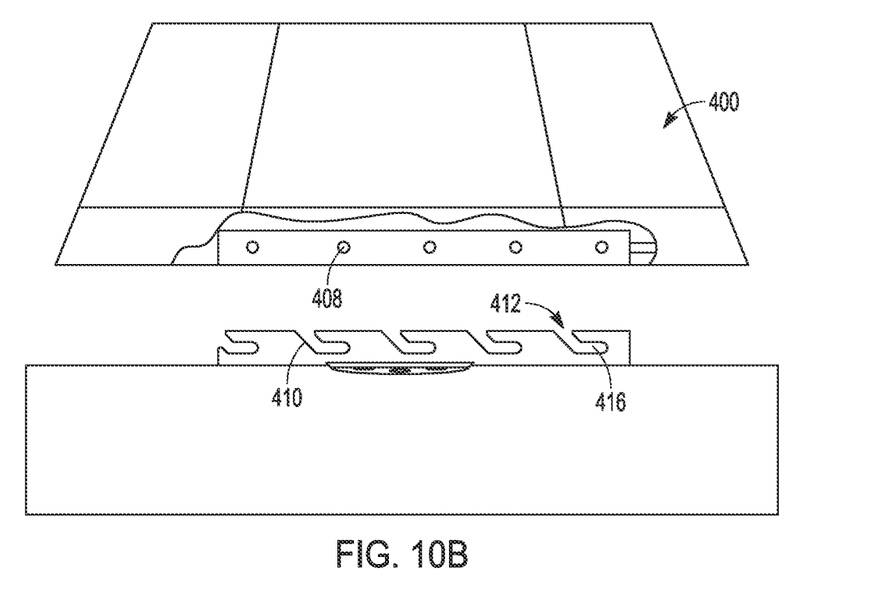
Figure 10C:
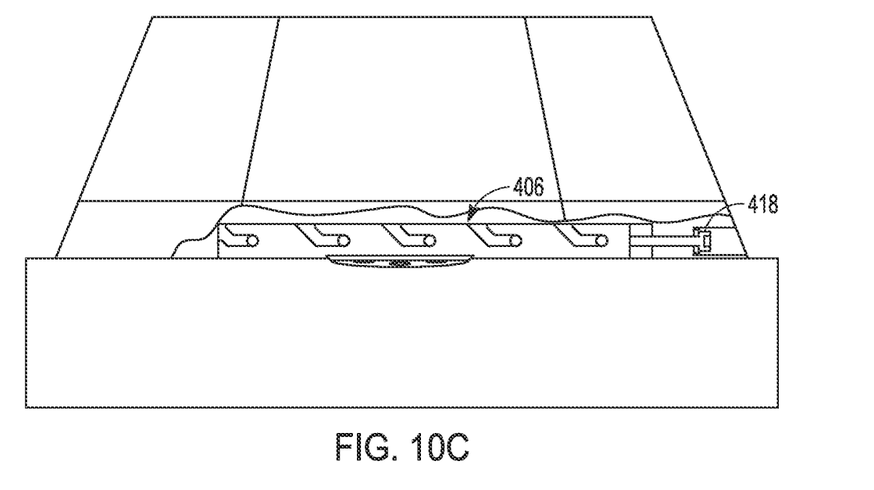

Referring now to FIGS. 10A-10C, a slot beam 414 is attached or integrally formed with a fixed joint 402 of an airframe 404. The pins 408 in the base of an airfoil 400 are aligned to respective lead-in portions 410 of slots 412 in slot beam 414. The pins 408 are engaged into the lead-in portions 410 and transition into tapered portions 416 of the slots to seat the airfoil in the slot beam and position the airfoil against the airframe in an XY plane. A threaded fastener 418 is manually actuated to apply a force along the X-axis to press the plurality of pins 408 into the respective tapered portions 416 to fix the airfoil relative to the slot beam forming a rigid joint 406 in 6 DOF.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

We claim:

1. A mechanism for attachment and detachment of an airfoil to an airframe, said airframe having a longitudinal X-axis in an XYZ coordinate system, comprising:
   a base including a plurality of pins spaced along and held between parallel rails, said base adapted for attachment to a root of the airfoil;
   a slot beam adapted for attachment to the airframe parallel to the X-axis, said slot beam including a plurality of slots arranged along the beam, each slot having a lead-in portion to receive one of the plurality of pins and a tapered portion parallel to the X-axis to engage the pin so that the base is seated in the slot beam to position the airfoil against the airframe in an XY plane; and
   a pre-load mechanism configured to apply a force along the X-axis to press the plurality of pins into the respective tapered portions to fix the base relative to the slot beam in six degrees of freedom (6 DOF).

2. The mechanism of claim 1, wherein the slot beam is integrally formed with either a fixed joint of the air frame or a hub recessed in the airframe that is connected to an actuator configured to rotate the hub and airfoil about the Y axis.

3. The mechanism of claim 1, wherein the slot beam and pins are configured such that each pin nominally supports the same axial force under pre-load and the same force during flight.

4. The mechanism of claim 1, wherein the base and slot beam do not present any Free Object Debris (FOD) during assembly or any intrusion into a flow field over the airframe and airfoil.

5. The mechanism of claim 1, wherein the tapered portion has an angle of taper between 1 and 5 degrees to engage the pin and seat the base within a desired range of motion along the X-axis.

6. The mechanism of claim 1, wherein the number of pins equals the number of slots such that the plurality of pins engage the respective plurality of slots.

7. The mechanism of claim 1, wherein the number of pins is less than the number of slots.

8. The mechanism of claim 1, wherein the base further includes an end section between the parallel rails, wherein the pre-load mechanism comprises a manually-actuated threaded fastener that is threaded through the end section and against the slot beam to pre-load the pins.

9. The mechanism of claim 8, wherein the pre-load mechanism further comprises a Belleville washer positioned between a head of the fastener and the end section to locks the fastener in place.

10. The mechanism of claim 1, wherein the pre-load mechanism comprises a positive retention spring or spring-loaded ball lock pin.

11. A flight vehicle, comprising:
   an airfoil including a base formed along a root of the airfoil, the base including a plurality of pins spaced along and held between parallel rails;
   an airframe including a slot beam positioned longitudinally along an X-axis of the airframe, said slot beam including a plurality of slots arranged along the beam, each slot having a lead-in portion to receive one of the plurality of pins and a tapered portion parallel to the X-axis to engage the pin so that the base is seated in the slot beam to position the airfoil against the airframe in an XY plane; and
   a pre-load mechanism configured to apply a force along the X-axis to press the plurality of pins into the respective tapered portions to fix the base relative to the slot beam in six degrees of freedom (6 DOF).

12. The mechanism of claim 11, wherein the slot beam is integrally formed with a fixed joint of the air frame.

13. The mechanism of claim 11, wherein the slot beam is integrally formed with a hub recessed in the airframe that is connected to an actuator configured to rotate the hub and airfoil about the Y axis.

14. The mechanism of claim 11, wherein the tapered axial portion has an angle of taper between 1 and 5 degrees to engage the pin and seat the base within a desired range of motion along the X-axis.

15. A method of attaching a detachable airfoil to an airframe, comprising:
   attaching a base along a root of the airfoil, said base including a plurality of pins spaced along and held between parallel rail;
   attaching a slot beam along a longitudinal X-axis of the airframe, said slot beam including a plurality slots arranged along the beam, each slot having a lead-in portion and a tapered portion parallel to the X-axis;
   positioning the airfoil such that the plurality of pins engage the respective lead-in portions of the slots in the slot beam;
   moving the airfoil longitudinally and toward the airframe such that the plurality of pins transition into the respective tapered portions of the slots of the slot beam so that the base is seated in the slot beam to position the airfoil against the airframe in an XY plane; and
   engaging a pre-load mechanism to provide a force along the X-axis to press the plurality of pins into the respective tapered portions to fix the base relative to the slot beam in six degrees of freedom (6 DOF).

16. The method of claim 15, wherein the slot beam is integrally formed with a fixed joint of the air frame.

17. The method of claim 15, wherein the slot beam is integrally formed with a hub recessed in the airframe that is connected to an actuator configured to rotate the hub and airfoil about the Y axis.

18. The method of claim 15, wherein the tapered axial portion has an angle of taper between 1 and 5 degrees to engage the pin and seat the base within a desired range of motion along the X-axis.

* * * * *

UNITED STATES PATENT AND TRADEMARK OFFICE
CERTIFICATE OF CORRECTION

PATENT NO. : 12,050,092 B2
APPLICATION NO. : 17/950539
DATED : July 30, 2024
INVENTOR(S) : Reller et al.

Page 1 of 1

It is certified that error appears in the above-identified patent and that said Letters Patent is hereby corrected as shown below:

In the Specification

In Column 3, Line 23, delete "which." and insert --which:-- therefor

Signed and Sealed this
First Day of April, 2025

Coke Morgan Stewart
*Acting Director of the United States Patent and Trademark Office*